R. H. McDOWELL.
APPARATUS FOR DRYING AND HARDENING CORN.
APPLICATION FILED JAN. 17, 1919.

1,341,275.

Patented May 25, 1920.
2 SHEETS—SHEET 1.

Witness
Lynn Latta

Inventor
R. H. McDowell
By Owong & Bair, Attys

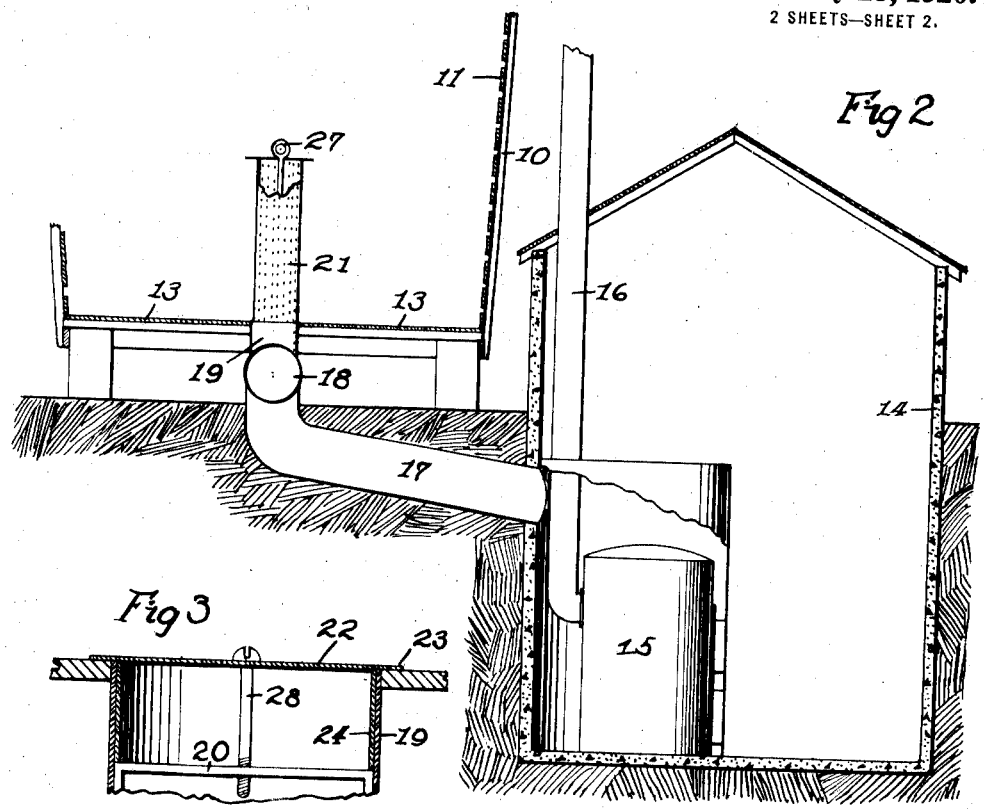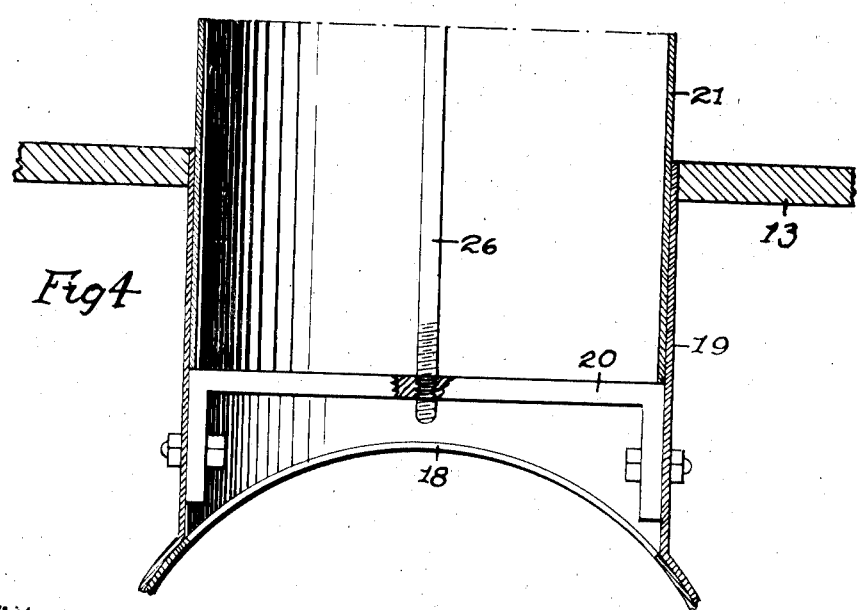

UNITED STATES PATENT OFFICE.

ROBERT H. McDOWELL, OF MARSHALLTOWN, IOWA.

APPARATUS FOR DRYING AND HARDENING CORN.

1,341,275.  Specification of Letters Patent.  Patented May 25, 1920.

Application filed January 17, 1919. Serial No. 271,729.

*To all whom it may concern:*

Be it known that I, ROBERT H. MC-DOWELL, a citizen of the United States, and resident of Marshalltown, in the county of Marshall and State of Iowa, have invented a certain new and useful Apparatus for Drying and Hardening Corn, of which the following is a specification.

In the "corn belt" it is the almost universal custom to erect corn cribs made of wood with slatted sides. That is to say, they are made open for purposes of ventilation and to permit the corn to dry by the action of the air blowing through.

Furthermore, in connection with the use of such corn cribs it is essential that the ears of corn be almost thoroughly dry and hardened before being placed in such cribs. It frequently happens that the corn is not dried sufficiently on the stalks during the corn harvesting season, on account of weather conditions, and when this gathering of the corn and placing it in the cribs is delayed until after cold weather sets in, the crop is never sufficiently dried and hardened to make good corn for feeding and seed purposes; and in cases where the undried and unhardened ears of corn are stored in the corn cribs, great loss of corn occurs, because the corn in the central portion of the crib will "fire," that is to say, ferment, and become over-heated and moldy.

The object of my invention is to provide an improved heating and drying apparatus designed to be permanently connected with a corn crib of the usual type, and so arranged that corn may be gathered before it is thoroughly dried and hardened, and placed in the crib and then heated slowly, gradually and uniformly until it is thoroughly dried and hardened, without danger of its becoming moldy or of "firing," so that after it has once become dried and hardened it will withstand the winter weather in the open corn cribs and be in perfect condition for feeding or seed purposes in the spring.

More specifically it is my object to provide heat distributers communicating with the furnace and arranged in such position in the corn crib as to supply the heat slowly, gradually and uniformly to the corn contained within the crib, and also to provide means whereby the heat pipes projected into the crib may be removed from the crib when the corn is being unloaded from the crib, and the communicating pipes closed so that they will not be in the way of the operator in removing the corn.

My invention consists in the construction, combination and arrangement of the heat distributing devices communicating with the furnace and arranged within the corn crib, whereby the objects contemplated are attained, as hereinafter more fully set forth, pointed out in my claims, and illustrated in the accompanying drawings, in which:

Fig. 2 shows a transverse, sectional view, taken on the line 2—2 of Fig. 1.

Fig. 3 shows an enlarged, detail, sectional view showing a portion of the crib floor with the distributing pipes removed and the heat distributing openings closed, and Fig. 4 shows an enlarged, detail, sectional view of the lower end portions of the heat distributing pipes, illustrating the manner in which they are supported and detachably connected with the horizontal heat distributing pipes.

Figure 1:
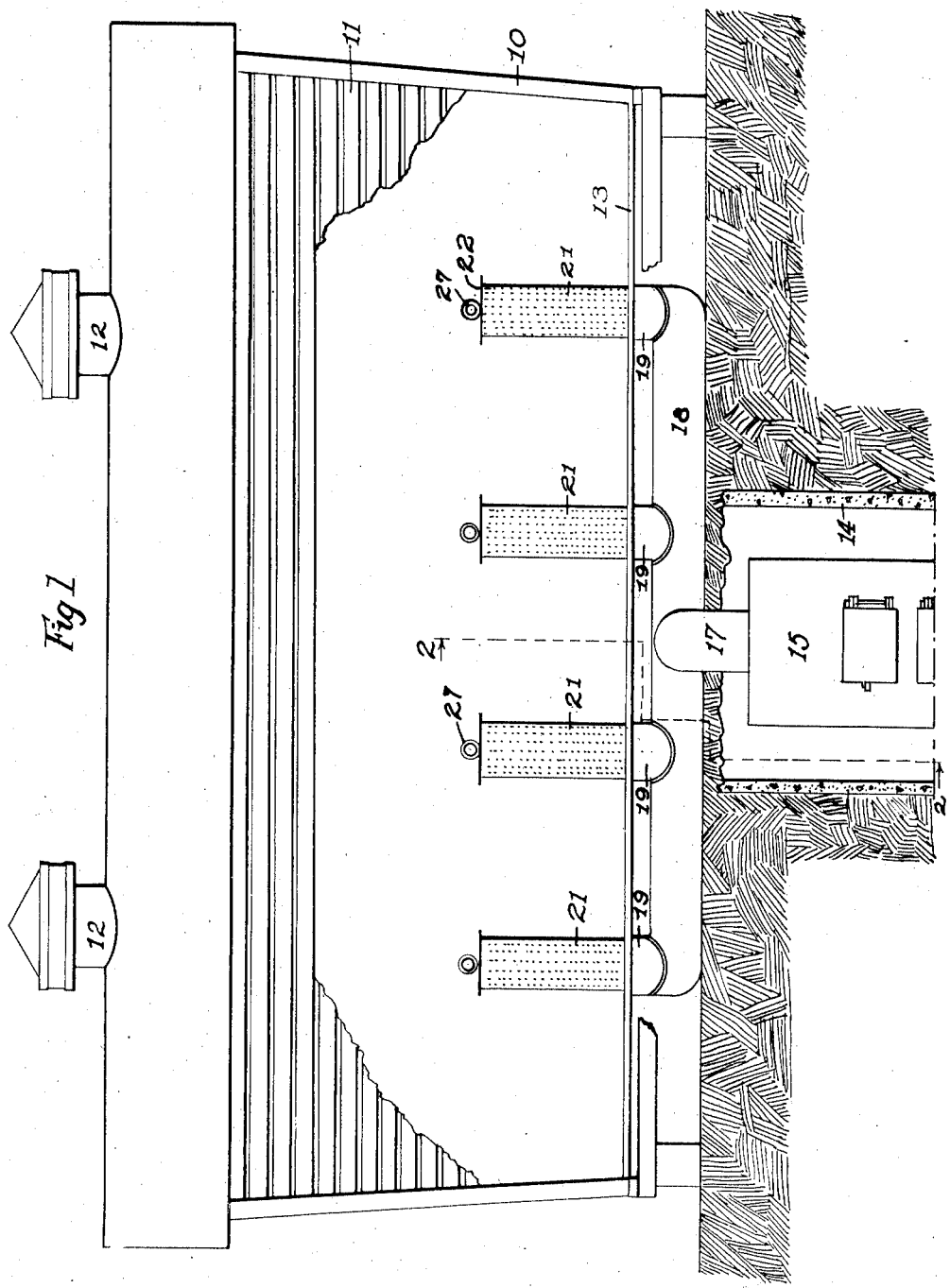
Figure 1 shows a side view, partly in section, illustrating a corn crib of the usual type, with parts broken away to show its interior, and also illustrating my improved heat distributing apparatus arranged therein.

Referring to the accompanying drawings, I have used the reference numeral 10 to indicate generally a corn crib of the ordinary kind, having slatted sides 11 and being provided with ventilators 12 at the top. The floor 13 is of the ordinary construction, and is formed of boards laid close together.

Arranged adjacent to the central portion of one side of the corn crib is a furnace pit 14, in which is contained a hot air furnace 15 of the ordinary construction, provided with a flue 16. Communicating with the furnace is a hot air pipe 17, which leads to and communicates with a horizontal heat distributing pipe 18, arranged longitudinally of the corn crib below the floor thereof. This horizontal distributing pipe 18 is provided at equally spaced intervals with a series of upright pipe members 19, which project up through and are preferably flush with the floor 13 of the corn crib. In each of these upright pipes 19 I provide a transverse supporting bar 20, secured at its sides to the pipe 19 and arranged a short distance below the floor 13.

For each of the pipes 19 I have provided a heat distributing pipe 21, which is cylindrical in shape, open at both ends and perforated throughout its entire length, and of such size as to fit inside of the pipe 19. Its lower end rests upon the cross bar 20, and at its upper end is a cap or cover 22 having a horizontal flange 23 at its top and a downwardly extending flange 24 designed to fit the interior of the pipe 21.

Extending through an opening in the cover 22 is a screw-threaded rod 26, having a handle 27 at its upper end. This screw-threaded rod is of such a length as to enter a suitable screw-threaded opening in the cross bar 20, as shown in Fig. 4, and thereby hold the upright heat distributing pipe firmly and securely in its position, so that it will not be knocked over when the ears of corn are deposited in the corn crib and around the heat distributing pipes.

When it is desired to remove the corn from the crib, which is usually done with a shovel, the upright heat distributing pipes would be in the road after the corn has been removed to a point near the floor, and for this purpose I have provided means whereby these upright heat distributing pipes may be very easily removed by simply unscrewing the rod 26 and then removing the upright heat distributing pipes and then placing the cap 22 in the upper end of the pipe 19, and I have provided a small screw 28 to extend through the opening in the cap 23 and into the cross bar 20, thus providing a flat sealing plate for the floor at the points closing the openings into the pipes 19, so that the ears of corn will not enter the pipes 19.

In practical operation and before placing corn in the crib, the screws 28 are removed and the caps or covers 22 are withdrawn from the open upper ends of the pipes 19. Then the upright heat distributing pipes 21 are placed in position and the screw-threaded rods 27 are passed through the covers 22 and seated in the cross bars 20 to firmly and securely hold these upright distributing pipes in position. Then the ears of corn are deposited in the crib in the ordinary way until it is filled.

Then the hot air furnace is fired, and heat passes therefrom through the pipe 17 and the horizontal distributing pipe 18, and it rises upwardly through the upright perforated pipes 21. There will be sufficient lateral distribution of the heat to thoroughly dry the ears of corn between the upright perforated pipes 21, and as the heat has a tendency to rise through the ears of corn, all of the corn above the upright pipes will also be dried.

Under conditions in which the corn is extremely wet and unhardened, it may be necessary and desirable to maintain small quantities of heat in the furnace for a period of several weeks, but under ordinary conditions the corn is sufficiently dried and hardened in approximately a week's time, after which the furnace need not be fired, except in cases where the weather is extremely wet and cold for long periods of time, in which event molding of the corn can be prevented by applying a slight amount of heat.

I have found that when the corn is once thoroughly dried and hardened, it will resist moisture to a very considerable extent before it is damaged; hence it is quite essential to have it dried and hardened before the wet and cold weather commences. The use of my improved drying and hardening apparatus makes it possible for the corn growers to harvest their corn at the most convenient season, regardless of its condition as to moisture. Hence, by the use of my apparatus a loss of considerable quantities of corn is avoided, because it will never be left standing in the field to dry and harden. Furthermore, after it has been placed in the crib, the corn will not "fire" or become molded, because as soon as it is placed in the crib it is thoroughly dried and hardened by my improved apparatus.

I claim as my invention:

1. In a corn crib having a heater arranged below the level of said crib whereby heated air may be distributed to said corn crib by levitation, a heat conducting device leading from said heater to the lower part of said crib, heat distributing means connected with said conducting device and projecting into said crib, means for detachably connecting said means and said device together in operative relation, a closure member, the parts being so arranged that when said distributing means is detached, said closure member may be mounted on said conducting device substantially flush with the floor of said crib.

2. In a corn crib, having a heat distributing pipe arranged beneath the floor of the corn crib and extended longitudinally thereof, and having upright pipe members arranged at intervals thereon, extending to a point adjacent to the floor, the combination of cross bars in said upright pipes below the floor level, a series of upright, perforated heat distributing removable pipes mounted in said upright pipes and resting upon the cross bars thereon, detachable covers for the upright perforated pipes, rods extended through said covers and detachably and adjustably secured to said cross bars, said covers being adapted to fit into the upright pipes that communicate with the horizontal pipe and seal the upper ends thereof when the perforated pipes have been removed, and means for securing them in position and to said cross bars, for the purposes stated.

3. In a corn crib having a heater arranged below the level of said crib whereby heated air may be distributed to said corn crib by levitation, a heat conducting device leading from said heater to the lower part of said crib and adapted to support a heat distributing means within said crib, or a closure member substantially flush with the floor of said crib, a detachable heat distributing means adapted to be mounted on said device and to project into said crib, and a closure member adapted to be mounted on said device, substantially flush with the floor of said crib when the heat distributing means is removed.

Des Moines, Iowa, August 8, 1918.

ROBERT H. McDOWELL.